United States Patent
Kobayashi et al.

(10) Patent No.: US 10,459,195 B2
(45) Date of Patent: Oct. 29, 2019

(54) IMAGING LENS AND IMAGING APPARATUS

(71) Applicant: NANCHANG O-FILM OPTICAL-ELECTRONIC TECH CO., LTD., Nanchang (CN)

(72) Inventors: Hiroaki Kobayashi, Saitama (JP); Takeshi Kamiya, Saitama (JP)

(73) Assignee: NANCHANG O-FILM OPTICAL-ELECTRONIC TECH CO., LTD., Nanchang (CN)

(*) Notice: Subject to any disclaimer, the term of this patent is extended or adjusted under 35 U.S.C. 154(b) by 0 days.

(21) Appl. No.: 15/609,161

(22) Filed: May 31, 2017

(65) Prior Publication Data

US 2017/0371131 A1    Dec. 28, 2017

(30) Foreign Application Priority Data

Jun. 28, 2016   (JP) ................. 2016-127318

(51) Int. Cl.
*G02B 9/62*    (2006.01)
*B60R 1/12*    (2006.01)
*G02B 13/04*   (2006.01)

(52) U.S. Cl.
CPC ............. *G02B 9/62* (2013.01); *B60R 1/12* (2013.01); *G02B 13/04* (2013.01); *B60R 2001/1253* (2013.01)

(58) Field of Classification Search
CPC ........................................................ G02B 9/62
USPC ................................................. 359/762, 713
See application file for complete search history.

(56) References Cited

U.S. PATENT DOCUMENTS

| 8,248,715 B2* | 8/2012 | Asami | G02B 13/04 |
| | | | 359/752 |
| 2014/0029115 A1 | 1/2014 | Iiao et al. | |
| 2014/0204479 A1* | 7/2014 | Asami | G02B 13/04 |
| | | | 359/762 |

* cited by examiner

*Primary Examiner* — James C. Jones
(74) *Attorney, Agent, or Firm* — Hodgson Russ LLP (57) ABSTRACT

Disclosed are a high-performance imaging lens which has a comparatively wide angle and in which, in particular, distortion is satisfactory corrected, and an imaging apparatus including the imaging lens. The imaging lens consists of, in order from an object side, a first lens L1 having negative refractive power, a second lens L2 having negative refractive power, a third lens L3 having positive refractive power, a fourth lens L4 having positive refractive power, a fifth lens L5, and a sixth lens L6. One of the fifth lens L5 and the sixth lens L6 has positive refractive power, and the other lens has negative refractive power. The following conditional expressions (1) and (2) are satisfied.

$-0.37 < f/f1 < -0.13$ (1)

$1.8 < t3/f < 3.8$ (2)

20 Claims, 7 Drawing Sheets

EXAMPLE 1

FIG. 1

EXAMPLE 1

FIG. 2

EXAMPLE 2

FIG. 3

EXAMPLE 3

FIG. 4

EXAMPLE 4

FIG. 6

EXAMPLE 2

FIG. 9

IMAGING LENS AND IMAGING APPARATUS

CROSS-REFERENCE TO RELATED APPLICATIONS

The present application claims priority under 35 U.S.C. § 119 to Japanese Patent Application No. 2016-127318, filed on Jun. 28, 2016. Each of the above application(s) is hereby expressly incorporated by reference, in its entirety, into the present application.

BACKGROUND OF THE INVENTION

1. Field of the Invention

The present invention relates to an imaging lens suitable for, in particular, an in-vehicle camera, and an imaging apparatus including the imaging lens.

2. Description of the Related Art

In recent years, a camera is mounted in a vehicle and is used to help confirmation of blind areas, such as the sides and/or the rear of a driver, or is used for image recognition of vehicles, pedestrians, and/or obstacles in the periphery of the vehicle.

As an imaging lens which is usable in such an in-vehicle camera for imaging the periphery of the vehicle, for example, an imaging lens described in US2014/0029115A is known. US2014/0029115A discloses a lens system having a six-lens configuration.

SUMMARY OF THE INVENTION

However, an imaging lens of US2014/0029115A has characteristics of a comparatively wide angle suitable for an in-vehicle camera for imaging the periphery of the vehicle with a full angle of view of about 92° to 105°, but distortion is not sufficiently corrected.

The invention has been accomplished in consideration of the above-described situation, and an object of the invention is to provide a high-performance imaging lens which has a comparatively wide angle and in which, in particular, distortion is satisfactorily corrected, and an imaging apparatus including the imaging lens.

An imaging lens of the invention consists of, in order from an object side, a first lens having negative refractive power, a second lens having negative refractive power, a third lens having positive refractive power, a fourth lens having positive refractive power, a fifth lens, and a sixth lens, one of the fifth lens and the sixth lens has positive refractive power and the other lens has negative refractive power, and the following conditional expressions (1) and (2) are satisfied;

$$-0.37 < f'/f1 < -0.13 \quad (1)$$

$$1.8 < t3/f' < 3.8 \quad (2)$$

where
f': a focal length of an entire system
f1: a focal length of the first lens
t3: a central thickness of the third lens.

In the imaging lens of the invention, it is preferable that the following conditional expression (3) is satisfied;

$$-0.6 < f'/f2 < -0.35 \quad (3)$$

where
f': the focal length of the entire system
f2: a focal length of the second lens.

It is preferable that the following conditional expression (4) is satisfied, and it is more preferable that the following conditional expression (4-1) is satisfied;

$$0.55 < tmin/f' \quad (4)$$

$$0.55 < tmin/f' < 0.69 \quad (4-1)$$

where
tmin: a minimum value of the central thicknesses of the first lens to the sixth lens
f': the focal length of the entire system.

It is preferable that the first lens has a convex surface toward the object side.

It is preferable that the following conditional expression (5) is satisfied;

$$110 < 2\omega \quad (5)$$

where
$2\omega$: a full angle of view, the unit of which is degree (°).

An imaging apparatus of the invention comprises the imaging lens of the invention described above.

In the specification, the term "consists of" means that the imaging lens of the invention may include, in addition to the components listed above, lenses substantially having no power, optical elements, such as a stop, a mask, a cover glass, and a filter, other than the lenses, mechanical parts, such as a lens flange, a lens barrel, an imaging element, and/or a camera shake correction mechanism, and the like.

The surface shapes, the radii of curvature, and the signs of refractive power of the above-described lenses are those which are considered in a paraxial region in a case where the lenses include aspheric surfaces.

Since the imaging lens of the invention consists of, in order from the object side, the first lens having negative refractive power, the second lens having negative refractive power, the third lens having positive refractive power, the fourth lens having positive refractive power, the fifth lens, and the sixth lens, one of the fifth lens and the sixth lens has positive refractive power and the other lens has negative refractive power, and the following conditional expressions (1) and (2) are satisfied, it is possible to configure a high-performance imaging lens which has a comparatively wide angle and in which, in particular, distortion is satisfactorily corrected.

$$-0.37 < f'/f1 < -0.13 \quad (1)$$

$$1.8 < t3/f' < 3.8 \quad (2)$$

Since the imaging apparatus of the invention includes the imaging lens of the invention, it is possible to acquire an image having high image quality at a comparatively wide angle.

DESCRIPTION OF THE PREFERRED EMBODIMENTS

Figure 1:
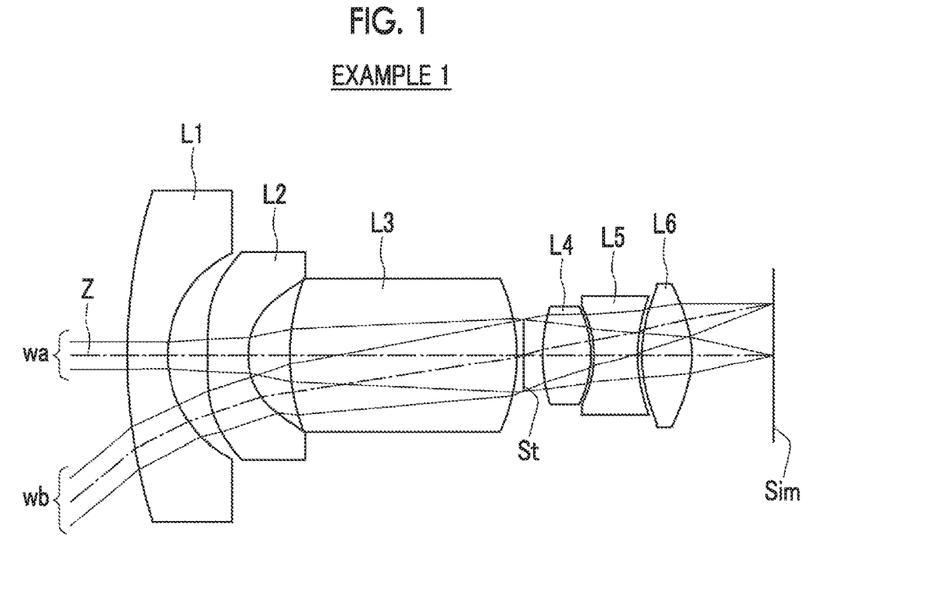
FIG. 1 is a sectional view showing the lens configuration of an imaging lens according to an embodiment of the invention (common with Example 1).

Hereinafter, an embodiment of the invention will be described in detail referring to the drawings. FIG. 1 is a sectional view showing the lens configuration of an imaging lens according to an embodiment of the invention. The configuration example shown in FIG. 1 is common with the configuration of an imaging lens of Example 1 described below. In FIG. 1, the left side is an object side, and the right side is an image side. An aperture stop St illustrated in the drawing does not necessarily represent the size and/or shape thereof, but indicates the position of the stop on an optical axis Z. FIG. 1 also shows an axial light beam wa and a light beam wb at a maximum angle of view.

The imaging lens of this embodiment substantially includes, in order from the object side, a first lens L1 having negative refractive power, a second lens L2 having negative refractive power, a third lens L3 having positive refractive power, a fourth lens L4 having positive refractive power, a fifth lens L5, and a sixth lens L6, and one of the fifth lens L5 and the sixth lens L6 has positive refractive power and the other lens has negative refractive power.

FIG. 1 shows an example where the imaging lens includes, in order from the object side, the first lens L1 having negative refractive power, the second lens L2 having negative refractive power, the third lens L3 having positive refractive power, the fourth lens L4 having positive refractive power, the fifth lens L5 having negative refractive power, and the sixth lens L6 having positive refractive power.

The imaging lens is configured such that the following conditional expressions (1) and (2) are satisfied.

The imaging lens is configured such that the value of f'/f1 is not equal to or greater than an upper limit defined in the conditional expression (1), whereby it is possible to achieve a wide angle. The imaging lens is configured such that the value of f'/f1 is not equal to or less than a lower limit defined in the conditional expression (1), whereby, since it is possible to prevent rays from being sharply bent at the first lens L1, it is possible to prevent the occurrence of large negative distortion.

The imaging lens is configured such that the value of t3/f' is not equal to or greater than an upper limit defined in the conditional expression (2), whereby it is possible to shorten the total length of the lens. The imaging lens is configured such that the value of t3/f' is not equal to or less than a lower limit defined in the conditional expression (2), whereby it becomes easy to separate axial rays and off-axial rays and to correct a field curvature and distortion.

$$-0.37 < f'/f1 < -0.13 \quad (1)$$

$$1.8 < t3/f' < 3.8 \quad (2)$$

where f': a focal length of an entire system f1: a focal length of the first lens t3: a central thickness of the third lens.

In the imaging lens of this embodiment, it is preferable that the following conditional expression (3) is satisfied.

The imaging lens is configured such that the value of f'/f2 is not equal to or greater than an upper limit defined in the conditional expression (3), whereby it is possible to achieve a wide angle. The imaging lens is configured such that the value of f'/f2 is not equal to or less than a lower limit defined in the conditional expression (3), whereby, since it is possible to prevent rays from being sharply bent at the second lens L2, it is possible to prevent the occurrence of large negative distortion.

$$-0.6 < f'/f2 < -0.35 \quad (3)$$

where f': the focal length of the entire system f2: a focal length of the second lens.

It is preferable that the following conditional expression (4) is satisfied.

The imaging lens is configured such that the value of tmin/f' is not equal to or less than a lower limit defined in the conditional expression (4), whereby it is possible to prevent breakage of the lens even in a case where the imaging lens of this embodiment is used as an in-vehicle lens under violent vibration.

If the following conditional expression (4-1) is satisfied, it is possible to achieve more satisfactory characteristics. The imaging lens is configured such that the value of tmin/f' is not equal to or greater than an upper limit defined in the conditional expression (4-1), whereby it is possible to reduce the total length of the lens.

$$0.55 < tmin/f' \quad (4)$$

$$0.55 < tmin/f' < 0.69 \quad (4-1)$$

where tmin: a minimum value of the central thicknesses of the first lens to the sixth lens f': the focal length of the entire system.

It is preferable that the first lens L1 has a convex shape toward the object side. With such a configuration, it becomes easy to correct distortion in a peripheral portion even in a lens having a wide angle and to suppress a reflection loss when peripheral rays are incident.

It is preferable that the following conditional expression (5) is satisfied.

The conditional expression (5) is satisfied, whereby it is possible to configure an imaging lens having a wide angle.

$$110° < 2\omega \quad (5)$$

where $2\omega$: a full angle of view, the unit of which is degree (°).

In a case where this imaging lens is used in a tough environment, it is preferable that protective multilayered film coating is applied. In addition to the protective coating, anti-reflection coating for reducing ghost light during use may be applied.

When the imaging lens is applied to an imaging apparatus, a cover glass, a prism, and/or various filters, such as an infrared cut filter or a low-pass filter, may be provided between a lens system and an image plane Sim according to the configuration of a camera side in which the lens is mounted. Instead of providing various filters between the lens system and the image plane Sim, various filters may be provided between the respective lenses, or coating having the same operations as various filters may be applied to the surface of any lens.

Next, examples of numerical values of the imaging lens of the invention will be described.

First, an imaging lens of Example 1 will be described. FIG. 1 is a sectional view showing the lens configuration of the imaging lens of Example 1. In FIG. 1 and FIGS. 2 to 4 corresponding to Examples 2 to 4 described below, the left side is the object side, and the right side is the image side. An aperture stop St illustrated in the drawings does not necessarily represent the size and/or shape thereof, but indicates the position of the stop on an optical axis Z.

The imaging lens of Example 1 includes, in order from the object side, a first lens L1 which is made of glass and has negative refractive power, a second lens L2 which is made of plastic and has negative refractive power, a third lens L3 which is made of glass and has positive refractive power, a fourth lens L4 which is made of glass and has positive refractive power, a fifth lens L5 which is made of glass and has negative refractive power, and a sixth lens L6 which is made of plastic and has positive refractive power.

Basic lens data of the imaging lens of Example 1 is shown in Table 1, data relating to specifications is shown in Table 2, and data relating to aspheric coefficient is shown in Table 3. Hereinafter, although the meanings of the symbols in the tables will be described for Example 1, the meanings of the symbols are basically the same for Examples 2 to 4.

In lens data of Table 1, the column "Surface Number" shows a surface number which is given in a sequentially increasing manner toward the image side with the surface of the component on the most object side designated as first, the column of "Radius of Curvature" shows the radius of curvature of each surface, and the column "Surface Distance" shows the distance between each surface and the next surface on the optical axis Z. The column "n" shows the refractive index of each optical element with respect to d-line (wavelength of 587.6 nm, where nm refers to nanometer), the column "ν" shows the Abbe number of each optical element with respect to d-line (wavelength of 587.6 nm), and the column "α" shows the linear expansion coefficient ($10^{-7}/°$ C.) of each optical element.

The signal of the radius of curvature is positive in a case where the surface shape is convex toward the object side, and is negative in a case where the surface shape is convex toward the image side. Basic lens data also includes the aperture stop St. Text reading (stop) is described along with the surface number in the column of the surface number of the surface corresponding to the aperture stop St.

Data relating to specifications of Table 2 shows the values of the focal length f of the entire system, the back focus Bf, the F-Number FNo., and the full angle of view 2ω.

In basic lens data and data relating to specifications, degree (°) is used as the unit of angle and millimeter (mm) is used as the unit of length, but other appropriate units may be used since optical systems are usable even if the optical systems are proportionally enlarged or proportionally reduced.

In lens data of Table 1, an asterisk mark * is attached to the surface number of each aspheric surface, and a numerical value of a paraxial radius of curvature is shown as the radius curvature of each aspheric surface. Data relating to aspheric coefficients of Table 3 shows the surface numbers of the aspheric surfaces and the aspheric coefficients relating to the aspheric surfaces. "E±n" (where n: integer) in the numerical values of the aspheric coefficients of Table 3 means "×10$^{±n}$". The aspheric coefficients are the values of respective coefficients KA and Am (m=3, . . . , 20) in an expression of aspheric surface represented by the following expression.

$$Zd = C \cdot h^2 / \{1 + (1 - KA \cdot C^2 \cdot h^2)^{1/2}\} + \Sigma Am \cdot h^m$$

where

Zd: a depth of the aspheric surface (a length of a vertical line from a point on the aspheric surface at a height h to a plane perpendicular to the optical axis in contact with the apex of the aspheric surface)

h: a height (a distance from the optical axis to lens surface)

C: a reciprocal of the paraxial radius of curvature

KA, Am: aspheric coefficient (m=3, . . . 20).

TABLE 1

EXAMPLE 1 - LENS DATA (n AND ν ARE d-LINE)

| SURFACE NUMBER | RADIUS OF CURVATURE | SURFACE DISTANCE | n | ν | α |
|---|---|---|---|---|---|
| 1 | 20.3028 | 1.5000 | 1.74100 | 52.64 | 57.00 |
| 2 | 4.2136 | 1.4854 | | | |
| *3 | −66.7401 | 1.5000 | 1.53112 | 55.30 | 630.00 |
| *4 | 3.2042 | 1.5430 | | | |
| 5 | 8.0644 | 8.3762 | 1.88300 | 40.76 | 66.00 |
| 6 | −6.7942 | 0.2409 | | | |
| 7 (STOP) | ∞ | 0.7183 | | | |
| 8 | 6.1909 | 1.7754 | 1.59349 | 67.00 | 93.00 |
| 9 | −4.0092 | 0.1215 | | | |
| 10 | 3.8398 | 1.6291 | 1.80518 | 25.46 | 93.00 |
| 11 | 5.9530 | 0.1556 | | | |
| *12 | 5.1604 | 1.8696 | 1.53112 | 55.30 | 630.00 |
| *13 | −3.9711 | 2.9996 | | | |

TABLE 2

EXAMPLE 1 - SPECIFICATIONS (d-LINE)

| | |
|---|---|
| f | 2.39 |
| Bf | 3.00 |
| FNo. | 2.30 |
| 2ω [°] | 112.8 |

TABLE 3

EXAMPLE 1 - ASPHERIC COEFFICIENTS

| SURFACE NUMBER | 3 | 4 | 12 | 13 |
|---|---|---|---|---|
| KA | −2.1120444E+04 | 1.0120456E+00 | 6.3203502E−01 | 9.6045330E−01 |
| A3 | −1.0007639E−18 | −7.7728658E−18 | 1.2491205E−18 | 0.0000000E+00 |
| A4 | 1.2035517E−02 | 2.8290320E−02 | −2.8723966E−03 | 3.3262411E−03 |
| A5 | 3.4925834E−03 | −2.2465106E−02 | −1.3389507E−03 | 3.8089336E−03 |

TABLE 3-continued

EXAMPLE 1 - ASPHERIC COEFFICIENTS

| SURFACE NUMBER | 3 | 4 | 12 | 13 |
|---|---|---|---|---|
| A6 | −1.7644286E−03 | 2.0106307E−02 | 1.2778906E−03 | −2.6248824E−03 |
| A7 | −9.1430617E−04 | −1.3930922E−03 | −4.3972174E−05 | 2.1750156E−04 |
| A8 | 2.9033335E−04 | −9.4089130E−03 | −1.2090377E−04 | 4.0811069E−04 |
| A9 | 1.1915352E−04 | 3.0662182E−03 | 5.6020956E−06 | −7.6634876E−05 |
| A10 | −2.2645196E−05 | 1.9995855E−03 | 6.5740497E−06 | −3.0907313E−05 |
| A11 | −1.2709427E−05 | −9.4788210E−04 | −2.0584027E−07 | 6.7529706E−06 |
| A12 | 7.7391901E−07 | −2.2253373E−04 | −2.1663318E−07 | 1.6472761E−06 |
| A13 | 1.0137671E−06 | 1.3949212E−04 | 4.0843971E−09 | −3.0682211E−07 |
| A14 | 5.5402972E−09 | 1.2664694E−05 | 4.3709198E−09 | −4.8154837E−08 |
| A15 | −5.1274270E−08 | −1.1038824E−05 | −4.7338732E−11 | 7.7859011E−09 |
| A16 | −1.6097241E−09 | −3.1529323E−07 | −5.2667344E−11 | 8.3099004E−10 |
| A17 | 1.4282739E−09 | 4.5305343E−07 | 3.0084359E−13 | −1.0457359E−10 |
| A18 | 5.9378122E−11 | 1.4372804E−09 | 3.4748010E−13 | −7.7560229E−12 |
| A19 | −1.6499136E−11 | −7.5821623E−09 | −8.1315830E−16 | 5.7929156E−13 |
| A20 | −7.6804042E−13 | 2.0300401E−11 | −9.6504156E−16 | 2.9924720E−14 |

Figure 5:
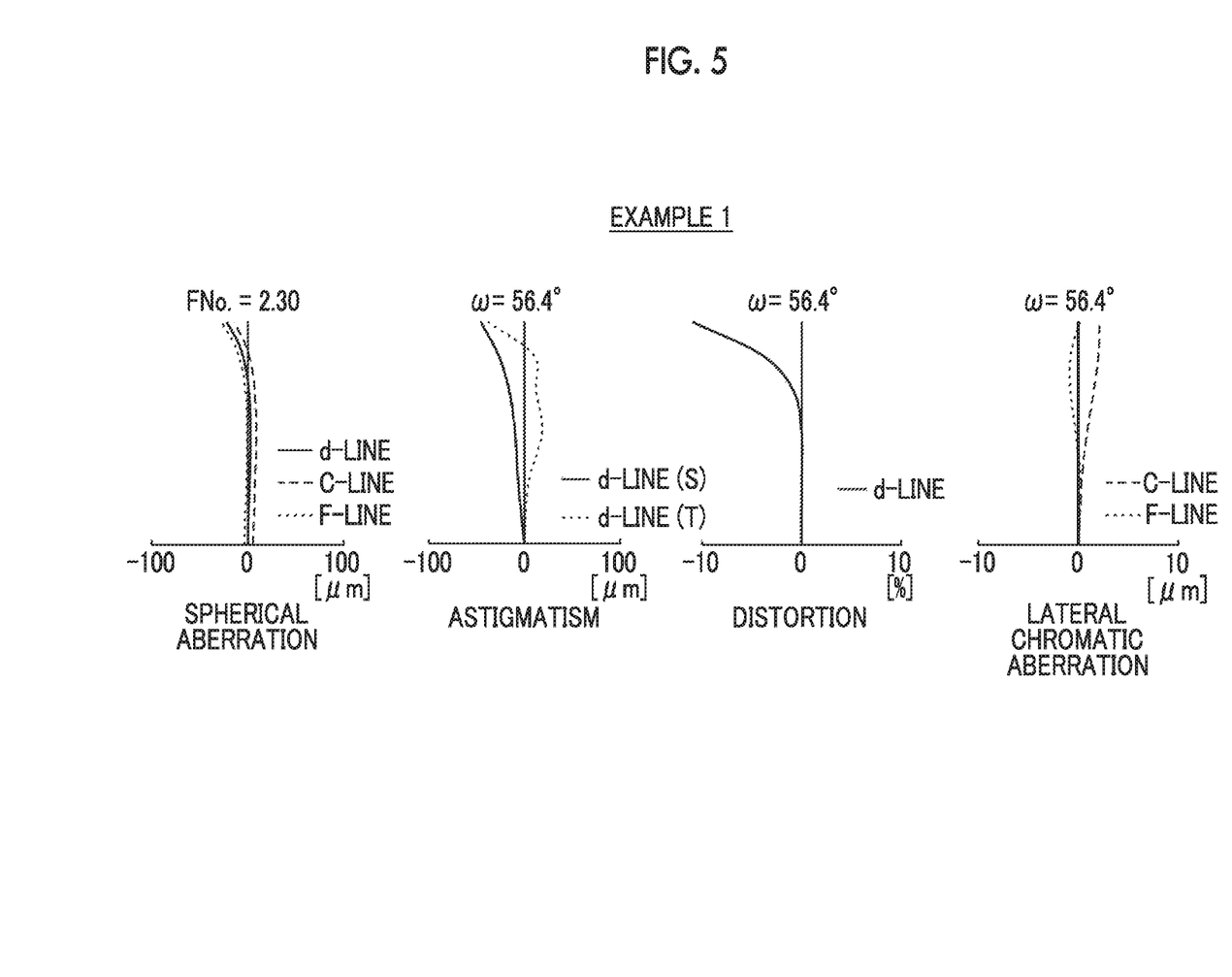
FIG. 5 shows aberration diagrams of the imaging lens of Example 1 of the invention.

FIG. 5 shows respective aberration diagrams of the imaging lens of Example 1. Spherical aberration, astigmatism, distortion, and lateral chromatic aberration are shown in order from the left side in FIG. 5. These aberration diagrams show states when the object distance is infinity. The respective aberration diagrams of spherical aberration, astigmatism, and distortion show aberrations with d-line (wavelength of 587.6 nm) as a reference wavelength. In the spherical aberration diagram, aberrations with respect to d-line (wavelength of 587.6 nm), C-line (wavelength of 656.3 nm), and F-line (wavelength of 486.1 nm) are respectively indicated by a solid line, a long broken line, and a short broken line. In the astigmatism diagram, aberrations in a sagittal direction and a tangential direction are respectively indicated by a solid line and a short broken line. In the lateral chromatic aberration diagram, aberrations with respect to C-line (wavelength of 656.3 nm) and F-line (wavelength of 486.1 nm) are respectively indicated by a long broken line and a short broken line. It should be noted that FNo. in the spherical aberration diagram means an F-Number, and ω in other aberration diagrams means a half angle of view.

The signs, the meanings, and the description methods used in the description of Example 1 described above will apply to the following examples unless otherwise specifically described, and thus, overlapping description will be omitted in the following description.

Figure 2:
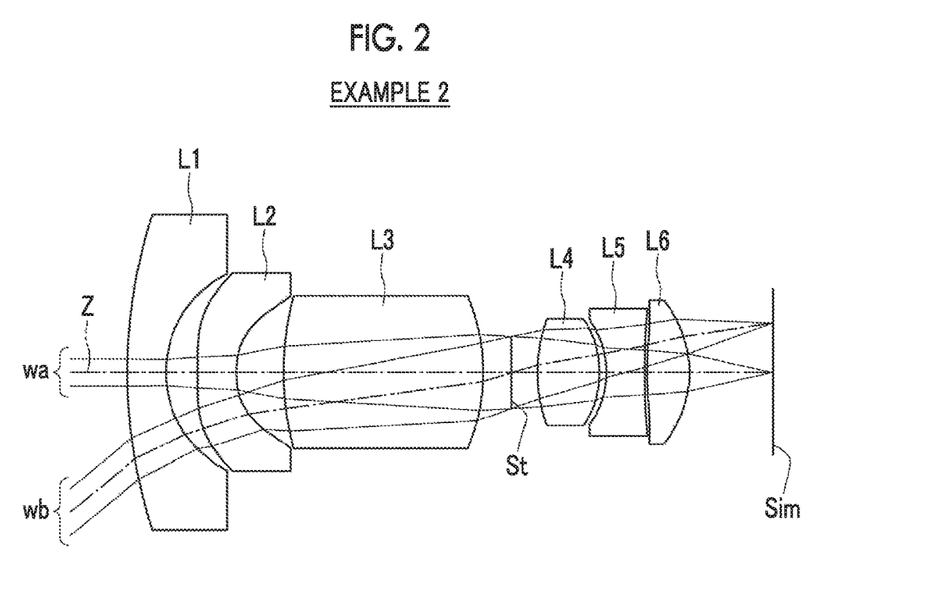
FIG. 2 is a sectional view showing the lens configuration of an imaging lens according to Example 2 of the invention.
Figure 6:
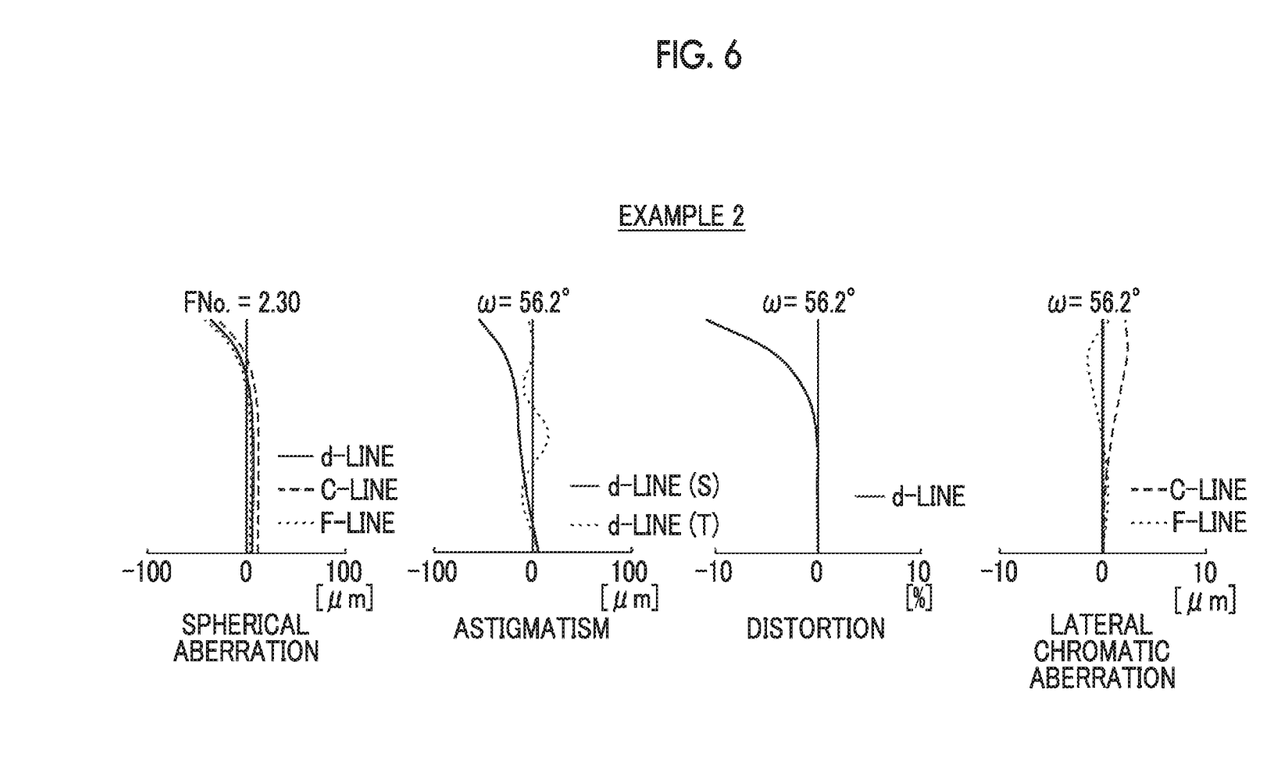
FIG. 6 shows aberration diagrams of the imaging lens of Example 2 of the invention.

Next, an imaging lens of Example 2 will be described. The materials and the configuration of refractive power of the imaging lens of Example 2 are the same as in Example 1. FIG. 2 is a sectional view showing the lens configuration of the imaging lens of Example 2. Basic lens data of the imaging lens of Example 2 is shown in Table 4, data relating to specifications is shown in Table 5, data relating to aspheric coefficients is shown in Table 6, and respective aberration diagrams are shown in FIG. 6.

TABLE 4

EXAMPLE 2 - LENS DATA (n AND ν ARE d-LINE)

| SURFACE NUMBER | RADIUS OF CURVATURE | SURFACE DISTANCE | n | ν | α |
|---|---|---|---|---|---|
| 1 | 19.6147 | 1.5019 | 1.80420 | 46.50 | 63.00 |
| 2 | 4.2222 | 1.2428 | | | |
| *3 | −56.8489 | 1.5000 | 1.53112 | 55.30 | 630.00 |
| *4 | 3.6494 | 1.8161 | | | |
| 5 | 11.4009 | 7.7693 | 1.85150 | 40.78 | 68.00 |
| 6 | −7.4190 | 1.1002 | | | |
| 7 (STOP) | ∞ | 0.9835 | | | |
| 8 | 6.0933 | 2.4064 | 1.55032 | 75.50 | 116.00 |
| 9 | −3.7498 | 0.2644 | | | |
| 10 | −3.4734 | 1.5000 | 1.80809 | 22.76 | 95.00 |
| 11 | 27.7368 | 0.1000 | | | |
| *12 | 11.5212 | 1.6706 | 1.53112 | 55.30 | 630.00 |
| *13 | −4.0534 | 3.2415 | | | |

TABLE 5

EXAMPLE 2 - SPECIFICATIONS (d-LINE)

| | |
|---|---|
| f | 2.40 |
| Bf | 3.24 |
| FNo. | 2.30 |
| 2ω [°] | 112.4 |

TABLE 6

EXAMPLE 2 - ASPHERIC COEFFICIENTS

Figure 3:
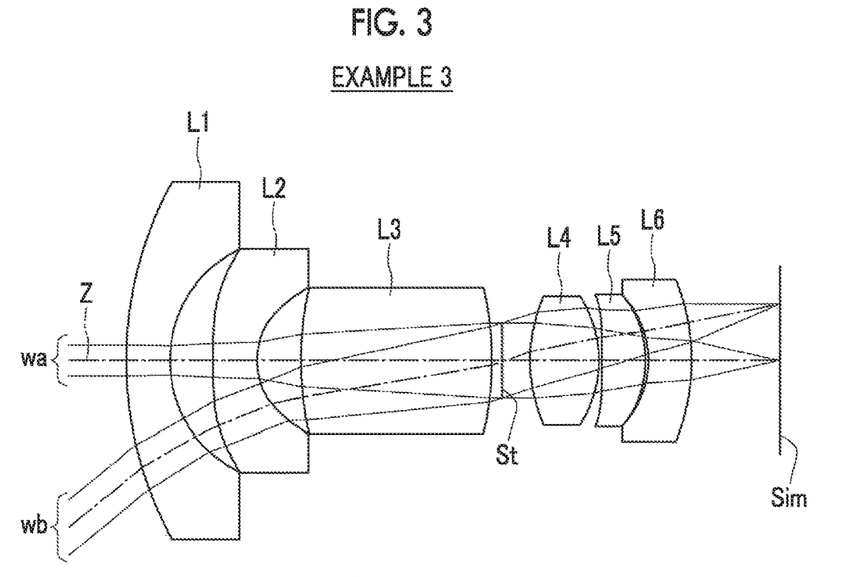
FIG. 3 is a sectional view showing the lens configuration of an imaging lens according to Example 3 of the invention.
Figure 7:
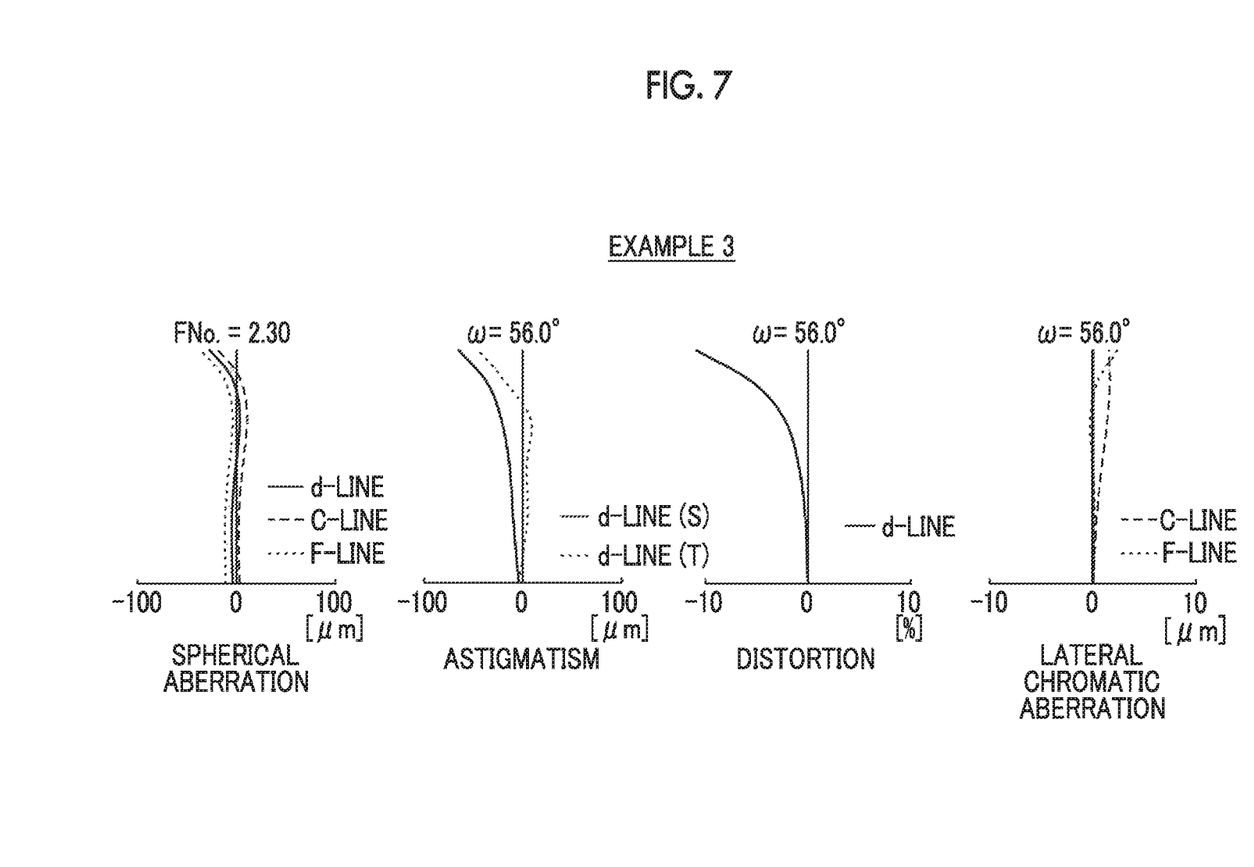
FIG. 7 shows aberration diagrams of the imaging lens of Example 3 of the invention.

| SURFACE NUMBER | 3 | 4 | 12 | 13 |
|---|---|---|---|---|
| KA | −2.1120444E+04 | 1.0120456E+00 | 6.3203502E−01 | 9.6045330E−01 |
| A3 | 1.7348943E−18 | 1.4385317E−17 | −3.2630485E−18 | 2.2097799E−18 |
| A4 | 7.0605441E−03 | 2.8056728E−02 | −3.3236688E−03 | 1.1017258E−03 |
| A5 | 7.3305304E−03 | −2.6973577E−02 | −3.2404276E−03 | 3.3336154E−03 |
| A6 | −1.2363881E−03 | 2.1484138E−02 | 1.7403955E−03 | −2.7607130E−03 |
| A7 | −1.9986820E−03 | 3.3014022E−03 | 2.5517546E−04 | 1.2107436E−04 |
| A8 | 3.7770590E−04 | −1.0522105E−02 | −3.4470504E−04 | 7.0538811E−04 |
| A9 | 2.8464733E−04 | 9.7325067E−04 | −5.2273752E−04 | −2.1681223E−04 |
| A10 | −5.8711912E−05 | 2.4585663E−03 | 3.5923635E−05 | −6.5151006E−05 |
| A11 | −2.6024467E−05 | −4.1062745E−04 | −8.1450375E−07 | 4.4752017E−05 |
| A12 | 5.5615815E−06 | −3.3739098E−04 | −2.1934055E−06 | −1.8409543E−06 |
| A13 | 1.5327604E−06 | 6.1882790E−05 | 6.9097052E−08 | −4.4382098E−06 |
| A14 | −3.2840131E−07 | 2.8617182E−05 | 8.1244810E−08 | 8.3041793E−07 |
| A15 | −5.5975201E−08 | −4.7663167E−06 | −2.3465217E−09 | 2.3858658E−07 |
| A16 | 1.1560817E−08 | −1.4998986E−06 | −1.7982234E−09 | −6.5276140E−08 |
| A17 | 1.1526559E−09 | 1.8763678E−07 | 3.8099155E−11 | −6.6783559E−09 |
| A18 | −2.1930296E−10 | 4.5222582E−08 | 2.1886911E−11 | 2.2131891E−09 |
| A19 | −1.0210619E−11 | −2.9971815E−09 | −2.4372287E−13 | 7.6279594E−11 |
| A20 | 1.7041722E−12 | −6.0617805E−10 | −1.1275942E−13 | −2.8404157E−11 | next, an imaging lens of Example 3 will be described. The imaging lens of Example 3 includes, in order from the object side, a first lens L1 which is made of glass and has negative refractive power, a second lens L2 which is made of plastic and has negative refractive power, a third lens L3 which is made of glass and has positive refractive power, a fourth lens L4 which is made of glass and has positive refractive power, a fifth lens L5 which is made of plastic and has positive refractive power, and a sixth lens L6 which is made of glass and has negative refractive power. FIG. 3 is a sectional view showing the lens configuration of the imaging lens of Example 3. Basic lens data of the imaging lens of Example 3 is shown in Table 7, data relating to specifications is shown in Table 8, data relating to aspheric coefficients is shown in Table 9, and respective aberration diagrams are shown in FIG. 7.

TABLE 7

EXAMPLE 3 - LENS DATA (n AND ν ARE d-LINE)

| SURFACE NUMBER | RADIUS OF CURVATURE | SURFACE DISTANCE | n | ν | α |
|---|---|---|---|---|---|
| 1 | 12.6664 | 1.5000 | 1.64000 | 60.08 | 58.00 |
| 2 | 4.2222 | 1.4904 | | | |

TABLE 7-continued

EXAMPLE 3 - LENS DATA (n AND ν ARE d-LINE)

| SURFACE NUMBER | RADIUS OF CURVATURE | SURFACE DISTANCE | n | ν | α |
|---|---|---|---|---|---|
| *3 | −58.8051 | 1.5000 | 1.53112 | 55.30 | 630.00 |
| *4 | 2.8236 | 1.4958 | | | |
| 5 | 11.2727 | 6.5218 | 1.89190 | 37.13 | 75.00 |
| 6 | −10.5747 | 0.3459 | | | |
| 7 (STOP) | ∞ | 0.9573 | | | |
| 8 | 5.3412 | 2.3529 | 1.49700 | 81.61 | 132.00 |
| 9 | −4.0035 | 0.1024 | | | |
| *10 | −275.4543 | 1.5000 | 1.53112 | 55.30 | 630.00 |
| *11 | −3.8455 | 0.1000 | | | |
| 12 | −3.2208 | 1.5060 | 1.95906 | 17.47 | 59.00 |
| 13 | −7.2245 | 3.0001 | | | |

TABLE 8

EXAMPLE 3 - SPECIFICATIONS (d-LINE)

| | |
|---|---|
| f | 2.42 |
| Bf | 3.00 |
| FNo. | 2.30 |
| 2ω [°] | 112.0 |

TABLE 9

EXAMPLE 3 - ASPHERIC COEFFICIENTS

| SURFACE NUMBER | 3 | 4 | 10 | 11 |
|---|---|---|---|---|
| KA | −2.1120444E+04 | 1.0120456E+00 | 6.3203502E−01 | 9.6045330E−01 |
| A3 | −1.0421876E−18 | −1.2223112E−17 | −3.4186835E−17 | 0.0000000E+00 |
| A4 | 8.7389063E−03 | 3.3097140E−02 | −3.6762644E−03 | −2.6956034E−03 |
| A5 | 4.9040275E−03 | −3.4880653E−02 | −5.5745274E−03 | 3.8016175E−03 |
| A6 | −1.3676446E−03 | 3.7323115E−02 | 3.1345948E−03 | −4.5950501E−03 |
| A7 | −1.8580088E−03 | −4.9715039E−03 | −1.3677035E−04 | 1.1232858E−03 |
| A8 | 4.4834484E−04 | −2.1837771E−02 | −4.7280595E−04 | 9.2795821E−04 |
| A9 | 3.0431276E−04 | 9.1552861E−03 | 2.5480785E−05 | −4.9657092E−04 |
| A10 | −7.3564223E−05 | 6.1552800E−03 | 3.7109931E−05 | −7.9074282E−05 |
| A11 | −3.2113537E−05 | −3.5928311E−03 | −1.6076051E−06 | 7.0519739E−05 |
| A12 | 7.3337699E−06 | −9.4385007E−04 | −1.7104351E−06 | 1.9643751E−06 |
| A13 | 2.2258255E−06 | 6.9075031E−04 | 5.4859112E−08 | −5.2373882E−06 |
| A14 | −4.6484626E−07 | 8.1843202E−05 | 4.7856787E−08 | 1.5219977E−07 |

TABLE 9-continued

EXAMPLE 3 - ASPHERIC COEFFICIENTS

| SURFACE NUMBER | 3 | 4 | 10 | 11 |
|---|---|---|---|---|
| A15 | −9.6650458E−08 | −7.2081534E−05 | −1.0641667E−09 | 2.1767090E−07 |
| A16 | 1.8133890E−08 | −4.2473239E−06 | −7.9928029E−10 | −1.2950218E−08 |
| A17 | 2.3724518E−09 | 3.9219067E−06 | 1.1018144E−11 | −4.7937011E−09 |
| A18 | −3.9518255E−10 | 1.4645908E−07 | 7.3282236E−12 | 3.6980213E−10 |
| A19 | −2.4984199E−11 | −8.7325459E−08 | −4.7231865E−14 | 4.3624044E−11 |
| A20 | 3.6610448E−12 | −3.0513370E−09 | −2.8381190E−14 | −3.8220799E−12 |

Figure 4:
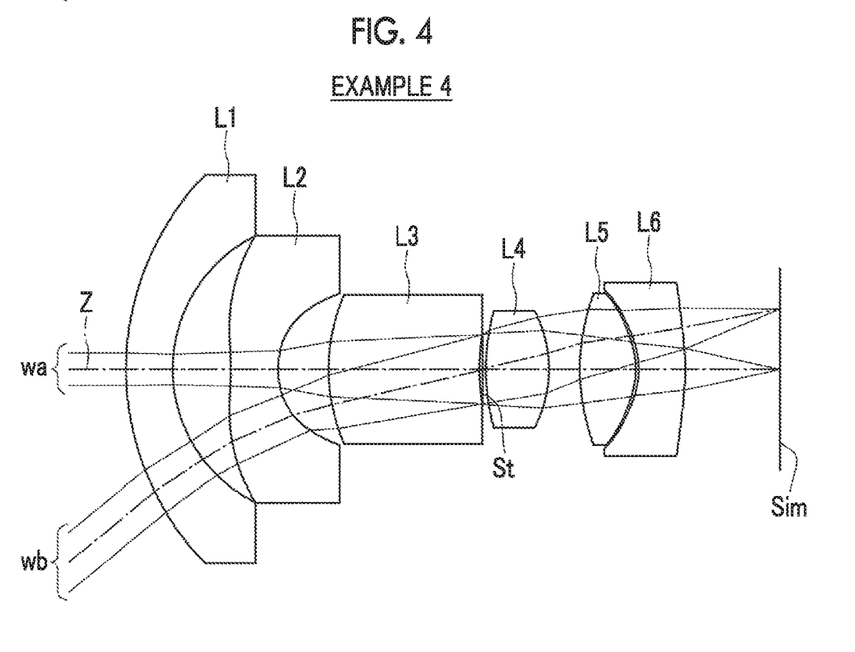
FIG. 4 is a sectional view showing the lens configuration of an imaging lens according to Example 4 of the invention.
Figure 8:
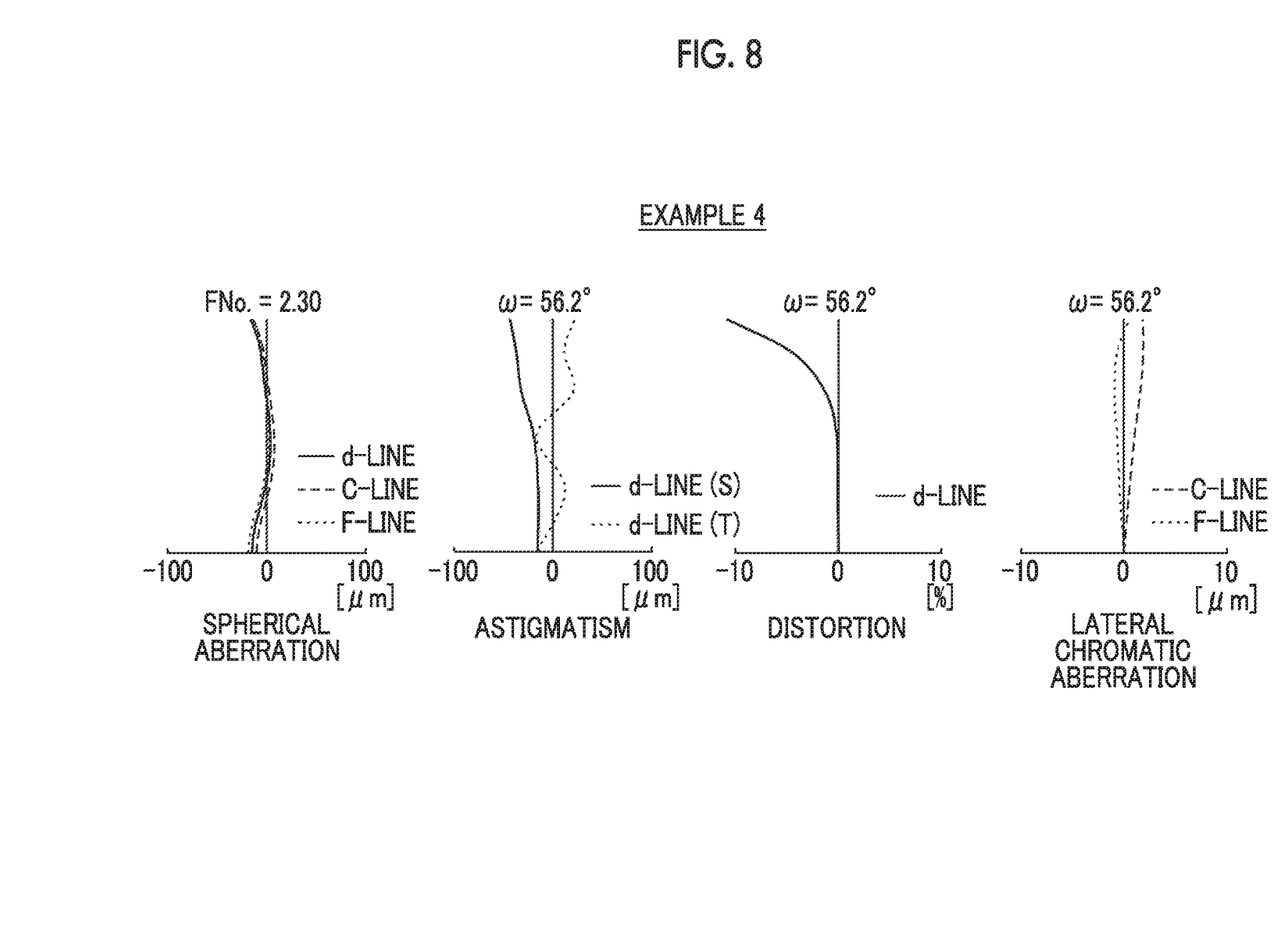
FIG. 8 shows aberration diagrams of the imaging lens of Example 4 of the invention.

Next, an imaging lens of Example 4 will be described. The imaging lens of Example 4 includes, in order from the object side, a first lens L1 which is made of glass and has negative refractive power, a second lens L2 which is made of plastic and has negative refractive power, a third lens L3 which is made of plastic and has positive refractive power, a fourth lens L4 which is made of glass and has positive refractive power, a fifth lens L5 which is made of plastic and has positive refractive power, and a sixth lens L6 which is made of plastic and has negative refractive power. FIG. 4 is a sectional view showing the lens configuration of the imaging lens of Example 4. Basic lens data of the imaging lens of Example 4 is shown in Table 10, data relating to specifications is shown in Table 11, data relating to aspheric coefficients is shown in Table 12, and respective aberration diagrams are shown in FIG. 8.

TABLE 10

EXAMPLE 4 - LENS DATA (n AND ν ARE d-LINE)

| SURFACE NUMBER | RADIUS OF CURVATURE | SURFACE DISTANCE | n | ν | α |
|---|---|---|---|---|---|
| 1 | 8.7332 | 1.5000 | 1.74100 | 52.64 | 57.00 |
| 2 | 4.7210 | 1.8517 | | | |
| *3 | −8.9662 | 1.5108 | 1.53112 | 55.30 | 630.00 |
| *4 | 3.2541 | 1.6017 | | | |
| *5 | 5.9912 | 4.7971 | 1.63360 | 23.61 | 660.00 |
| *6 | 7.5715 | 0.1000 | | | |
| 7 (STOP) | ∞ | 0.1000 | | | |
| 8 | 6.7288 | 2.0113 | 1.59349 | 67.00 | 93.00 |
| 9 | −3.9988 | 0.9817 | | | |
| *10 | 6.2801 | 1.7914 | 1.53112 | 55.30 | 630.00 |
| *11 | −2.9305 | 0.1010 | | | |
| *12 | −2.6633 | 1.5000 | 1.63360 | 23.61 | 660.00 |
| *13 | −7.7746 | 3.0002 | | | |

TABLE 11

EXAMPLE 4 - SPECIFICATIONS (d-LINE)

| f | 2.40 |
|---|---|
| Bf | 3.00 |
| FNo. | 2.30 |
| 2ω [°] | 112.4 |

TABLE 12

EXAMPLE 4 - ASPHERIC COEFFICIENTS

| SURFACE NUMBER | 3 | 4 | 5 | 6 |
|---|---|---|---|---|
| KA | −8.5116921E+01 | 9.9658851E−01 | −3.3792087E+01 | −2.2814797E+01 |
| A3 | 7.7618699E−19 | −7.3708967E−18 | −4.1146816E−19 | −4.3516005E−18 |
| A4 | 1.4078166E−02 | 3.8254144E−02 | 2.2010866E−02 | 1.5477016E−02 |
| A5 | −3.2668896E−04 | 3.5992120E−03 | −3.4707407E−03 | −1.1955344E−02 |
| A6 | −1.8562470E−03 | −1.1843115E−02 | −5.4561551E−03 | 5.8064363E−03 |
| A7 | −7.3109138E−05 | 1.3393263E−03 | 1.2346803E−03 | 1.5087736E−03 |
| A8 | 2.4531998E−04 | 2.2256972E−03 | 9.8778316E−04 | −1.2295456E−03 |
| A9 | 9.3292938E−06 | −2.6197602E−04 | −1.9505382E−04 | −4.3745479E−04 |
| A10 | −2.2854287E−05 | −1.1623971E−04 | −1.2784507E−04 | 1.3713410E−04 |
| A11 | −7.9348764E−07 | −9.5725706E−05 | 1.7546158E−05 | 4.0378584E−05 |
| A12 | 1.5058895E−06 | −2.2705759E−05 | 1.1265976E−05 | −8.7875740E−06 |
| A13 | 4.4805066E−08 | 3.5008723E−05 | −9.3242272E−07 | −1.9068458E−06 |
| A14 | −6.7769139E−08 | 7.4575599E−06 | −6.4001685E−07 | 3.4897803E−07 |
| A15 | −1.5054287E−09 | −4.3367141E−06 | 2.8827408E−08 | 5.0246928E−08 |
| A16 | 1.9399420E−09 | −1.0170503E−06 | 2.2099889E−08 | −8.5589427E−09 |
| A17 | 2.7376321E−11 | 2.4440347E−07 | −4.7592266E−10 | −7.0447195E−10 |
| A18 | −3.1467276E−11 | 6.4647988E−08 | −4.1904238E−10 | 1.1935678E−10 |
| A19 | −2.0691760E−13 | −5.2969433E−09 | 3.2090179E−12 | 4.1201644E−12 |
| A20 | 2.1862954E−13 | −1.5415054E−09 | 3.3339089E−12 | −7.2406834E−13 |

| SURFACE NUMBER | 10 | 11 | 12 | 13 |
|---|---|---|---|---|
| KA | 8.5557948E−01 | 5.0350473E−01 | 7.7266793E−01 | −4.7835701E+01 |
| A3 | 6.4186893E−18 | 0.0000000E+00 | 2.4177162E−18 | 0.0000000E+00 |
| A4 | −2.3912056E−03 | −1.0211196E−02 | −2.5671109E−03 | −1.1049534E−02 |

TABLE 12-continued

| EXAMPLE 4 - ASPHERIC COEFFICIENTS | | | | |
|---|---|---|---|---|
| A5 | 3.5386329E−04 | 3.8622314E−03 | −5.0663359E−03 | 8.3698850E−03 |
| A6 | 2.3279072E−04 | 9.3480851E−03 | 3.0758703E−02 | 3.1158648E−03 |
| A7 | −1.4746662E−04 | 2.5811772E−03 | −5.6143437E−03 | −4.1372494E−03 |
| A8 | −1.5663017E−05 | −6.1604956E−03 | −2.2392318E−02 | −1.8656759E−04 |
| A9 | 3.6108744E−05 | −2.8488155E−03 | 9.0027323E−03 | 1.0329477E−03 |
| A10 | 2.7431560E−06 | 2.8681881E−03 | 7.5574113E−03 | −7.2709298E−05 |
| A11 | −3.2822416E−06 | 1.1830162E−03 | −4.3711232E−03 | −1.5127080E−04 |
| A12 | −3.0960721E−07 | −8.3338524E−04 | −1.2115242E−03 | 1.7332318E−05 |
| A13 | 1.5692334E−07 | −2.5587087E−04 | 1.0799279E−03 | 1.3364356E−05 |
| A14 | 1.7429678E−08 | 1.4347668E−04 | 4.4600584E−05 | −1.7055950E−06 |
| A15 | −4.1707497E−09 | 3.0436805E−05 | −1.4700541E−04 | −7.0015320E−07 |
| A16 | −5.1583398E−10 | −1.4279734E−05 | 1.2650663E−05 | 8.7625670E−08 |
| A17 | 5.8319794E−11 | −1.8897177E−06 | 1.0494011E−05 | 2.0011638E−08 |
| A18 | 7.7509569E−12 | 7.6144063E−07 | −1.7008335E−06 | −2.2892050E−09 |
| A19 | −3.3482863E−13 | 4.7877375E−08 | −3.0705090E−07 | −2.4022136E−10 |
| A20 | −4.6759715E−14 | −1.6861877E−08 | 6.4215391E−08 | 2.3837301E−11 |

Values corresponding to the conditional expressions (1) to (5) of the imaging lenses of Examples 1 to 4 are shown in Table 13. In all examples, d-line is used as a reference wavelength, and the values shown in Table 13 described below are with respect to the reference wavelength.

TABLE 13

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| (1) | f/f1 | −0.320 | −0.343 | −0.228 | −0.146 |
| (2) | t3/f | 3.505 | 3.237 | 2.695 | 1.999 |
| (3) | f/f2 | −0.418 | −0.375 | −0.481 | −0.557 |
| (4) | tmin/f | 0.628 | 0.625 | 0.620 | 0.625 |
| (5) | 2ω [°] | 112.80 | 112.40 | 112.00 | 112.40 |

As can be understood from data described above, all of the imaging lenses of Examples 1 to 4 satisfy the conditional expressions (1) to (5), and are high-performance imaging lenses which have a comparatively wide angle with the full angle of view of 100° or greater and in which, in particular, distortion is satisfactorily corrected.

Figure 9:
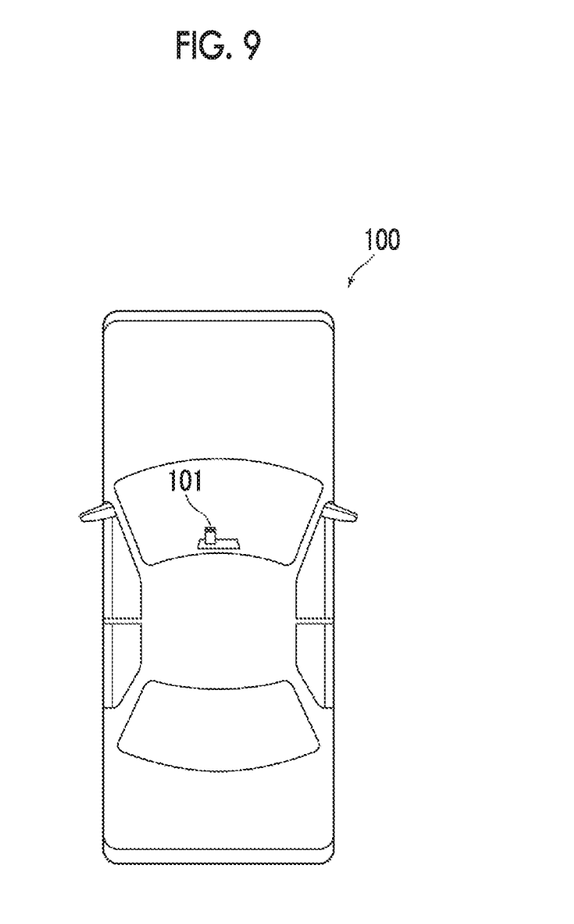
FIG. 9 is a schematic configuration diagram of an imaging apparatus according to an embodiment of the invention.

Next, an imaging apparatus according to an embodiment of the invention will be described. An example of a case where an in-vehicle camera is an embodiment of an imaging apparatus of the invention will be described. FIG. 9 shows a manner in which an in-vehicle camera is mounted in a vehicle.

In FIG. 9, a vehicle 100 includes an in-vehicle camera 101 (imaging apparatus) which is mounted on the back surface of a rear view mirror and images the same range as the field of view of a driver. The in-vehicle camera 101 includes an imaging lens according to the embodiment of the invention, and an imaging element which converts an optical image formed by the imaging lens to an electrical signal. The in-vehicle camera (in-vehicle camera 101) of this embodiment includes the imaging lens of the invention, and is thus capable of acquiring images with high image quality.

Although the invention has been described in connection with the embodiment and the examples, the invention is not limited to the foregoing embodiment and examples, and various modifications may be made. For example, the values of the radius of curvature, the surface distance, the refractive index, the Abbe number, and the like of each lens component are not limited to the values shown in the respective examples of numerical values, and may take other values.

The imaging apparatus according to the embodiment of the invention is particularly suitably an in-vehicle camera for imaging the outside of the vehicle, is not limited to the above-described in-vehicle camera for imaging in front of the vehicle, and may be an in-vehicle camera for imaging both rear sides of the vehicle as a substitute for a side view mirror or an in-vehicle camera for imaging the peripheral vicinity of the vehicle. Furthermore, the imaging apparatus may be an in-vehicle camera for imaging the inside of the vehicle. In addition to the in-vehicle camera, various aspects, such as a camera for a portable terminal, a surveillance camera, and a digital camera, may be made.

EXPLANATION OF REFERENCES

100: vehicle
101: in-vehicle camera
L1 to L6: lens
Sim: image plane
St: aperture stop
wa: axial light beam
wb: light beam at maximum angle of view
Z: optical axis

What is claimed is:

1. An imaging lens consisting of, in order from an object side:
   a first lens having negative refractive power;
   a second lens having negative refractive power;
   a third lens having positive refractive power;
   a fourth lens having positive refractive power;
   a fifth lens; and
   a sixth lens,
   wherein the fifth lens has positive refractive power and the sixth lens has negative refractive power, and
   the following conditional expressions (1) and (2) are satisfied;

$$-0.37 < f/f1 < -0.228 \quad (1)$$

$$1.8 < t3/f < 3.8 \quad (2)$$

where
f: a focal length of an entire system
f1: a focal length of the first lens
t3: a central thickness of the third lens.

2. The imaging lens according to claim 1,
wherein the following conditional expression (3) is satisfied;

$$-0.6 < f/f2 < -0.35 \tag{3}$$

where
f2: a focal length of the second lens.

3. The imaging lens according to claim 1,
wherein the following conditional expression (4) is satisfied;

$$0.55 < tmin/f \tag{4}$$

where
tmin: a minimum value of the central thicknesses of the first lens to the sixth lens.

4. The imaging lens according to claim 2,
wherein the following conditional expression (4) is satisfied;

$$0.55 < tmin/f \tag{4}$$

where
tmin: a minimum value of the central thicknesses of the first lens to the sixth lens.

5. The imaging lens according to claim 3,
wherein the conditional expression (4-1) is satisfied;

$$0.55 < tmin/f < 0.69 \tag{4-1}$$

6. The imaging lens according to claim 4,
wherein the conditional expression (4-1) is satisfied;

$$0.55 < tmin/f < 0.69 \tag{4-1}$$

7. The imaging lens according to claim 1,
wherein the first lens has a convex surface toward the object side.

8. The imaging lens according to claim 2,
wherein the first lens has a convex surface toward the object side.

9. The imaging lens according to claim 3,
wherein the first lens has a convex surface toward the object side.

10. The imaging lens according to claim 4,
wherein the first lens has a convex surface toward the object side.

11. The imaging lens according to claim 5,
wherein the first lens has a convex surface toward the object side.

12. The imaging lens according to claim 6,
wherein the first lens has a convex surface toward the object side.

13. The imaging lens according to claim 1,
wherein the following conditional expression (5) is satisfied;

$$110° < 2\omega \tag{5}$$

where
2ω: a full angle of view, the unit of which is degree (°).

14. The imaging lens according to claim 2,
wherein the following conditional expression (5) is satisfied;

$$110° < 2\omega \tag{5}$$

where
2ω: a full angle of view, the unit of which is degree (°).

15. The imaging lens according to claim 3,
wherein the following conditional expression (5) is satisfied;

$$110° < 2\omega \tag{5}$$

where
2ω: a full angle of view, the unit of which is degree (°).

16. The imaging lens according to claim 4,
wherein the following conditional expression (5) is satisfied;

$$110° < 2\omega \tag{5}$$

where
2ω: a full angle of view, the unit of which is degree (°).

17. The imaging lens according to claim 5,
wherein the following conditional expression (5) is satisfied;

$$110° < 2\omega \tag{5}$$

where
2ω: a full angle of view, the unit of which is degree (°).

18. The imaging lens according to claim 6,
wherein the following conditional expression (5) is satisfied;

$$110° < 2\omega \tag{5}$$

where
2ω: a full angle of view, the unit of which is degree (°).

19. The imaging lens according to claim 7,
wherein the following conditional expression (5) is satisfied;

$$110° < 2\omega \tag{5}$$

where
2ω: a full angle of view, the unit of which is degree (°).

20. An imaging apparatus comprising an imaging lens consisting of, in order from an object side:
a first lens having negative refractive power;
a second lens having negative refractive power;
a third lens having positive refractive power;
a fourth lens having positive refractive power;
a fifth lens; and
a sixth lens,
wherein the fifth lens has positive refractive power and the sixth lens has negative refractive power, and
the following conditional expressions (1) and (2) are satisfied;

$$-0.37 < f/f1 < -0.228 \tag{1}$$

$$1.8 < t3/f < 3.8 \tag{2}$$

where
f: a focal length of an entire system
f1: a focal length of the first lens
t3: a central thickness of the third lens.

* * * * *